July 14, 1936.　　A. W. BRUCE　　2,047,544
APPARATUS FOR APPLYING ADHESIVE WAX TO FOWLS AND THE LIKE
Filed April 16, 1934
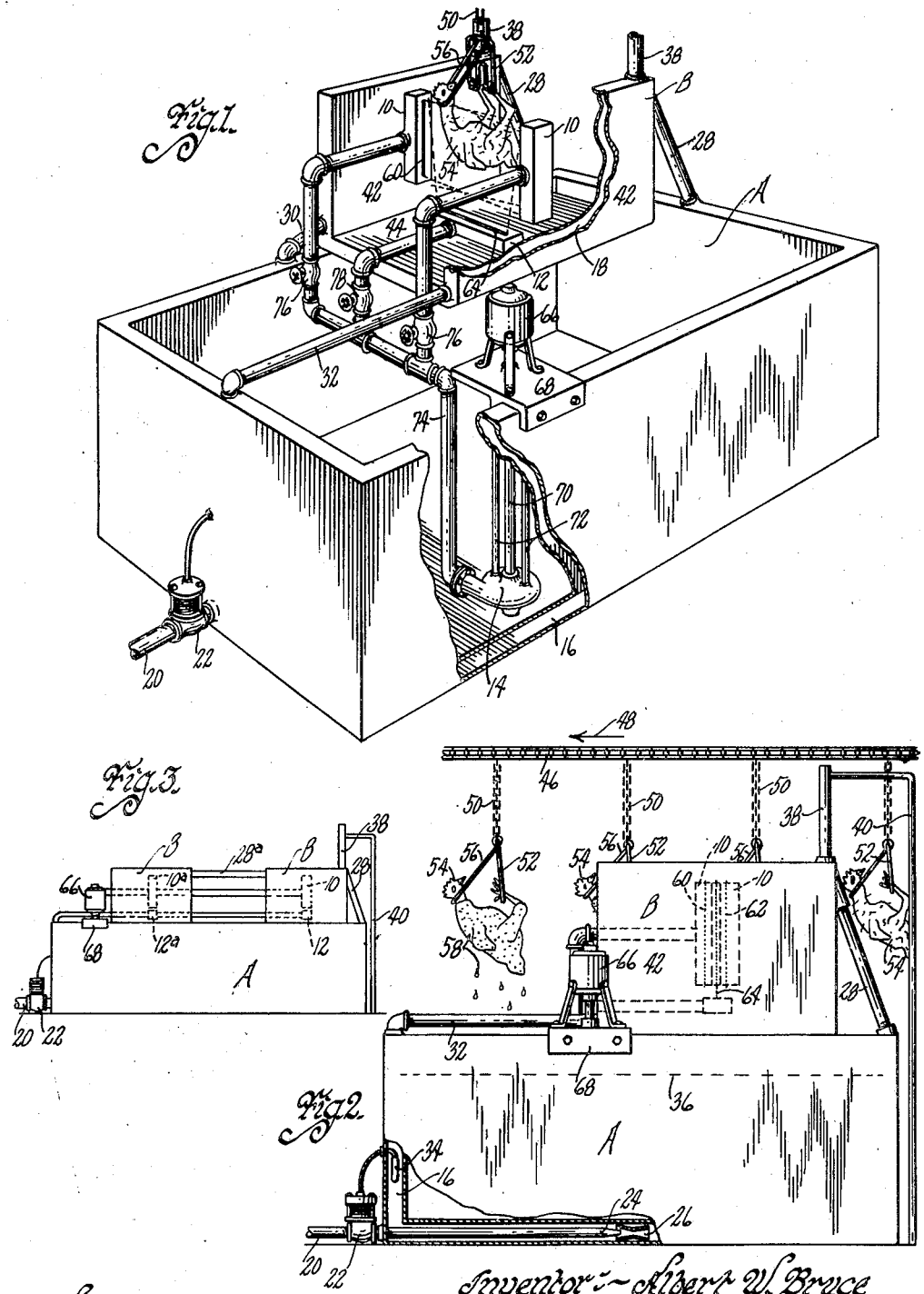
Inventor:— Albert W. Bruce
By Bair, Freeman & Sinclair
Attorneys Patented July 14, 1936

2,047,544

UNITED STATES PATENT OFFICE 2,047,544

APPARATUS FOR APPLYING ADHESIVE WAX TO FOWLS AND THE LIKE

Albert W. Bruce, Ottumwa, Iowa

Application April 16, 1934, Serial No. 720,792

13 Claims. (Cl. 17—11.1)

The object of my invention is to provide an apparatus for applying adhesive wax to fowls and the like which is simple, durable and comparatively inexpensive to manufacture.

A further object is to provide an apparatus for applying melted wax to fowls after they have been rough picked and dried so that the coating of wax can be subsequently cooled, then broken and peeled off the fowl to bring with it the remaining feathers, hair, dirt, etc. as by the method disclosed in my co-pending application Serial No. 692,117, filed October 4, 1933, now Patent No. 1,960,048, issued May 22, 1934.

A further object is to provide a wax applying apparatus which eliminates the necessity of moving the fowl downwardly into a wax bath or raising the wax bath around the fowl, thus coating the fowl with wax by the dipping method, the present apparatus being designed to flood the fowl with a heavy flow of wax, the amount of wax flowing on to the fowl being greatly in excess of that required for completely coating it, the surplus wax dripping from the fowl and flowing from nozzles which flood the fowl with wax, returning to a storage tank.

Still a further object is to provide an apparatus comprising a storage tank for melted wax, nozzles for flowing wax on fowls, a conveyor for conveying fowls past the nozzles and a pump or similar apparatus for withdrawing melted wax from the storage tank and discharging it from the nozzles.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a perspective view of a fowl waxing apparatus embodying my invention.

Figure 2 is a side elevation of the same; and

Figure 3 is a diagrammatic side elevation of a slightly modified form of the invention.

My apparatus includes, briefly, a storage tank A, a trough B, wax nozzles 10 and 12 and a pump 14. The storage tank A may be rectangular in form and is preferably double walled so as to provide jacket spaces 16. The trough B is also double walled to provide jacket spaces 18.

The jacket spaces 16 and 18 are designed to be filled with water and the water may be heated and kept at an even temperature by any suitable means. On the drawing I have illustrated a steam supply pipe 20, an automatic temperature responsive valve 22 for the steam supply pipe and a steam jet 24 located in the jacket 16. A Venturi tube 26 is associated with the steam jet 24 for the purpose of causing the steam discharged from the jet 24 to circulate the water through the jackets 16 and 18.

The jackets 16 and 18 are illustrated as independent of each other, pipe connections 28, 30 and 32 being provided to facilitate circulation of the water throughout the entire jacket system.

The automatic valve 22 may be of the bellows or other temperature responsive type having a bulb 34 located in the water of the jackets to cause the valve 22 to respond to the temperature of the water to thus maintain the temperature at an even degree by increasing the steam flow when the temperature drops and decreasing it when it rises. The valve 22 is, of course, preferably adjustable so that the temperature at which it is desired to operate may be automatically secured.

The temperature preferably ranges from 115° Fahrenheit to 130° Fahrenheit, as most of the waxes used in waxing fowls melt at these temperatures.

The wax is maintained at a suitable level, such as indicated at 36 in Figure 2 in the storage tank A and may be of any suitable composition, such for instance as that disclosed in the Rosenberger Patent No. 1,727,674, of September 10, 1929. The temperature is preferably maintained a few degrees above that at which the wax readily melts so that the wax can congeal and harden on the fowl soon after being flowed on to the fowl.

Due to the incoming steam condensing, the amount of water in the jackets 16 and 18 will be gradually increased. The surplus can be disposed of by means of stand pipes 38 open at their upper ends and provided with overflow pipes 40 extending to the sewer or other suitable point to which the excess can be drained. Each of the sides of the trough B is provided with such a stand pipe and overflow to prevent any air pockets in the jacket system.

The trough B consists of sides 42 and a bottom 44. It is located just above the storage tank A and adjacent one end thereof. Above the trough B is a conveyer chain 46 which travels in the direction of the arrow 48. It has additional chains 50 depending therefrom and provided on their lower ends with shackles 52 for the feet of the fowls 54. The shackles have head holders 56 for trussing up the head of the fowl after it has been rough picked and so that the wax, indicated at 58 on the fowl, may be applied to the body only and not to the head and feet. The purpose of this arrangement is to prevent waxing the head, which is not necessary and from which the wax is difficult to remove. It is, of course, not necessary to wax the feet of the fowl.

The nozzles 10 are indicated adjacent the side walls 42 of the trough B and directed toward each other, although they are preferably offset to cause sheets of wax, indicated at 60 and 62, to be offset from each other rather than impinge against each other and thus cause excessive splattering of the wax. The nozzle 12 is indicated adjacent the bottom 44 of the trough and directed upwardly so that the sheet of wax 64 therefrom is preferably offset from the sheets 60 and 62, all as illustrated by dotted lines in Figure 2.

For forcing the wax from the nozzles 10 and 12 any suitable mechanism can be provided. I have shown the pump 14 driven by an electric motor 66 which is supported on a bracket 68. The shaft of the motor is mounted at 70 and the pump 14 is supported by rods 72 extending downwardly from the bracket 68. An outlet pipe 74 extends from the pump 14 to valves 76 and 78 from which pipes extend to the nozzles 10 and 12. The valves are provided for the purpose of regulating the flow of the wax sheets 60, 62 and 64 relative to each other.

In Figure 3 I have shown a modified construction in which two troughs B are provided. The first trough B has nozzles 10 and 12 while the second trough B has nozzles 10a and 12a. There is a space between the troughs across which the fowls may travel for cooling the first coat of wax applied in the first trough B and then a second coat can be applied in the second trough B for thus applying two coatings of the wax when one application of the wax provides a coat of insufficient thickness.

The operation of the apparatus is quite simple. The conveyer chain 46 travels at a constant speed, depending on the time required for the fowl to be properly coated by the nozzles 10 and 12. The nozzles 10 and 12 continually discharge the wax in sheets 60, 62 and 64 and when the fowl 54 is conveyed past the nozzles the sheets of wax strike it and completely coat the fowl with the coating indicated at 58. Much more wax is flowed on to the fowl than is required to completely coat it, thus insuring that it will be completely coated, the surplus being readily taken care of by striking the walls 42 and the bottom wall 44 and then draining back into the storage tank A.

After the fowls are coated they are carried toward the left by the conveyer chain 46 and, when sufficient time has been allowed for the coating 58 to harden, the heads of the fowls are unhooked from the holders 56 and the fowl straightened out, which cracks and breaks the coating, whereupon it can be readily peeled from the fowl, taking with it the feathers left after rough picking, the hair, dirt, etc.

The present apparatus eliminates the mechanical complications required for dipping the fowls in a bath of melted wax, yet insures a complete coating of wax on the fowl by flooding it with an excess of wax as it passes between the nozzles. The fowl is flooded with the wax from both sides and the bottom and gravity tends to flood the upper side of the fowl as the sheets 60 and 62 tend to drop due to gravity after being discharged from the nozzles 10.

The essential features of the apparatus are means for keeping the wax in a melted condition and flooding the fowls with the melted wax by means of nozzles or the like. Means other than that illustrated can be provided for keeping the wax melted, mechanism other than a pump can be used for feeding the wax to the nozzles and other changes can be made without departing from the real spirit and purpose of my invention, and it is my invention to cover by my claims any modified forms of structure or use of mechanical equivalents which may be reasonably included within their scope.

I claim as my invention:

1. In an apparatus for applying adhesive wax to fowls and the like, means for supporting a fowl with its head and feet relatively close together and higher than its body, nozzles directed toward its body and means for discharging adhesive wax from said nozzles greatly in excess of the amount required for coating the body of the fowl with the wax.

2. In an apparatus for applying adhesive wax to fowls and the like, means for supporting a fowl, a pair of nozzles, one on each side of the fowl and directed toward but out of alinement with each other, a third nozzle below the fowl and directed upwardly but out of alinement with said pair of nozzles and means for discharging adhesive wax from said nozzles in excess of the amount required for completely coating the body of the fowl with the wax.

3. In an apparatus for applying adhesive wax to fowls, means for supporting a fowl, flow nozzles directed toward the fowl, a container for adhesive wax, means for maintaining said wax at a temperature but slightly higher than the melting point of the wax and means for discharging the melted wax from said flow nozzles in sheet formation and in excess of the amount required to completely coat the fowl.

4. In an apparatus for applying adhesive wax to an object, a storage tank, means for suspending an object thereover, nozzles directed toward said object in its suspended position, means for withdrawing a quantity of wax from said storage tank and discharging it from said nozzles toward said object, walls for the surplus wax to impinge against and from which the wax may drop into said storage tank and means for maintaining said walls at a temperature sufficiently high to melt any wax tending to congeal thereon.

5. In an apparatus for applying adhesive wax to fowls, a storage tank, means for suspending a fowl thereover, nozzles directed toward said fowl in its suspended position, means for withdrawing a quantity of wax from said storage tank and discharging it from said nozzles toward said fowl, an open end trough for catching the surplus wax and from the open ends of which it may return to said storage tank, said storage tank and said trough being jacketed and a heating medium in the jackets to maintain them and thereby the wax in the storage tanks and the wax impinging on the trough at a temperature slightly above the congealing temperature of the wax.

6. In an apparatus for applying adhesive wax to fowls, a storage tank, means for suspending a fowl thereover, nozzles directed toward said fowl in its suspended position, means for withdrawing a quantity of wax from said storage tank and discharging it from said nozzles toward said fowl, walls for surplus wax to impinge against and from which it may return to said storage tank, said storage tank and said walls being jacketed, a heating medium in the jackets and automatic means responsive to the temperature of the heating medium to maintain the heating medium at a substantially constant temperature.

7. A wax applying apparatus for fowls and the like comprising a storage tank, a pair of walls thereabove, means for heating said walls, a nozzle adjacent each wall and thereby heated therefrom, said nozzles being directed toward each other, and each toward the opposite wall, means for suspending an object between said nozzles, and a pump for withdrawing wax from said storage tank and discharging it from said nozzles against said object.

8. A fowl waxing apparatus comprising a jacketed storage tank, a steam jet associated with the jacket thereof for heating and circulating water through said jacket, means for suspending a fowl above said storage tank, nozzles directed toward said fowl and means for pumping melted wax from said storage tank and discharging it from said nozzles.

9. In a fowl waxing apparatus, a storage tank, nozzles for flooding a fowl therebetween with wax from said storage tank, a wall outside of each nozzle and adapted to have wax from the opposite nozzle impinge thereagainst, means for heating said walls to melt the wax impinging thereagainst and a pump for withdrawing the wax from the storage tank and discharging it from said nozzles.

10. Apparatus for applying a coating of wax to fowls and the like comprising a conveyer, fowls suspended therefrom, nozzles arranged with respect to the conveyer for travel of the fowls between the nozzles and means for supplying melted wax to and discharging it from said nozzles greatly in excess of the amount required for coating a fowl passing between the nozzles and means for recovering the excess wax falling from the fowls and nozzles, said means including impingement walls and means for heating said walls.

11. Fowl waxing apparatus comprising a heated storage tank, waxing nozzles located adjacent one end thereof, a conveyer for fowls traveling toward the opposite end of said tank, conveying said fowls between said nozzles, means for pumping wax from said storage tank and through said nozzles onto a fowl passing between them and impingement walls spaced from said nozzles, the surplus wax from said walls dropping into said storage tank after the fowl is coated, said walls and nozzles being located above said tank and thus subject to some heat arising therefrom.

12. In a device of the class described, a pair of spaced nozzles directed toward each other, means for so suspending a fowl between said nozzles that said fowl can rotate, and means for discharging coating material from said nozzles against said fowl, said nozzles being offset whereby to cause rotation of said fowl by discharge of material from said nozzles whereby to insure a full circumferential coating of the feathers of said fowl.

13. A wax applying apparatus for fowls and the like comprising a storage tank, a pair of walls thereabove, means for maintaining said walls at a temperature sufficiently high to melt wax impinging thereagainst, a nozzle adjacent each wall and thereby maintained at a temperature sufficiently high to prevent congelation of wax flowing therefrom, said nozzles being directed toward each other but arranged out of alignment, means for suspending a fowl between said nozzles and means for withdrawing wax from said storage tank and discharging it from said nozzles against said fowl and against said walls, the portion of the wax contacting with said walls being melted thereby and draining back into said storage tank.

ALBERT W. BRUCE.